United States Patent
Wolff Fabris et al.

(10) Patent No.: US 10,301,444 B2
(45) Date of Patent: May 28, 2019

(54) METHOD FOR PRODUCING A FIBROUS COMPOSITE MATERIAL

(75) Inventors: Felipe Wolff Fabris, Bayreuth (DE); Andreas Ferencz, Duesseldorf (DE); Katja Klophaus, Cologne (DE); Volker Altstadt, Hamburg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 743 days.

(21) Appl. No.: 13/243,068

(22) Filed: Sep. 23, 2011

(65) Prior Publication Data

US 2012/0015188 A1  Jan. 19, 2012

Related U.S. Application Data

(63) Continuation of application No. PCT/EP2010/053533, filed on Mar. 18, 2010.

(30) Foreign Application Priority Data

Mar. 25, 2009 (DE) .................. 10 2009 001 855

(51) Int. Cl.
| | |
|---|---|
| *B32B 9/00* | (2006.01) |
| *C08J 7/04* | (2006.01) |
| *C08J 5/24* | (2006.01) |
| *C08K 5/00* | (2006.01) |

(52) U.S. Cl.
CPC .............. *C08J 5/24* (2013.01); *C08J 2363/00* (2013.01); *C08K 5/0091* (2013.01); *Y10T 428/2933* (2015.01); *Y10T 428/2964* (2015.01)

(58) Field of Classification Search
CPC ........ C08J 263/00; C08J 2363/00; C08J 5/24; C08K 5/0091; Y10T 428/2933; Y10T 428/2964
USPC .......................... 427/501, 513; 428/375, 392
See application file for complete search history.

(56) References Cited

U.S. PATENT DOCUMENTS

| | | | |
|---|---|---|---|
| 4,778,851 A * | 10/1988 | Henton et al. ................... 525/65 |
| 4,783,506 A | 11/1988 | Gawin | |
| 4,863,787 A | 9/1989 | Gawin | |
| 4,972,218 A | 11/1990 | Weissburg | |
| 4,977,215 A | 12/1990 | Gardner et al. | |
| 5,248,550 A * | 9/1993 | Turpin ................. B29C 70/025 156/242 |
| 5,364,657 A * | 11/1994 | Throne ......................... 427/185 |
| 2005/0113474 A1* | 5/2005 | Kropp et al. ..................... 522/1 |
| 2006/0009562 A1* | 1/2006 | Sasaki ........................... 524/430 |
| 2007/0071973 A1* | 3/2007 | Gleich .......................... 428/375 |
| 2008/0139698 A1* | 6/2008 | Nishida et al. ............... 523/205 |
| 2010/0113639 A1* | 5/2010 | Doring et al. .................. 522/66 |

FOREIGN PATENT DOCUMENTS

| | | | |
|---|---|---|---|
| DE | 102007041988 | | 3/2009 |
| EP | WO2008064959 | * | 6/2008 |
| WO | WO2008064959 | | 6/2008 |
| WO | WO2008130484 | | 10/2008 |

OTHER PUBLICATIONS

International Search Report issued in connection with International Patent Application No. PCT/EP2010/053533 dated Jun. 2, 2010.
Hollemann-Wiberg, Lehrbuch der Anorganischen Chemie 101. Auflage, Walter de Gruyter Berlin New York 1995, S.1654-1655.
DIN EN 6033.
DIN EN 6034.
H. Masuda, M. Munakata, S. Kitagawa, "Raman spectra of copper(I) and silver(I) complexes with 1,5-cyclooctadiene and the nature of metal-olefin bonds. Possibility of a copper (I)-olefin bond in cytochrome oxidase", *J. Organomet. Chem.* 1990, 391, 131.
H.W. Qinn, R.L. Van Gilder, "Coordination compounds of olefins with anhydrous silver tetrafluoroborate V Complexes with some cyclic di- and oligo-olefins", *Can. J. Chem.* 1970, 48, 2435.
A. Albinati, S.V. Meille, G. Carturan, "The Crystal Structure of the Olefin Complex Di-1,5-Cyclooctadienesilver tetrafluoroborate", *J. Organomet. Chem.* 1979, 182, 269.
A.J. Canty, R. Colton, "Bonded alkene and arene complexes of silver(I): an electrospray mass spectrome study", *Inorg. Chim. Acta* 1994, 220, 99.

* cited by examiner

*Primary Examiner* — Camie S Thompson
(74) *Attorney, Agent, or Firm* — Steven C. Bauman

(57) ABSTRACT

The invention relates to a method for producing a fibrous composite material using at least one epoxy resin and at least one initiator comprising one or more cationic metal olefin complexes. The invention further relates to a fiber-containing agent and to a fiber-containing composite material as such.

13 Claims, No Drawings

METHOD FOR PRODUCING A FIBROUS COMPOSITE MATERIAL

The present invention relates to a method for manufacturing a fiber-containing composite material utilizing at least one epoxy resin and at least one initiator that contains one or more cationic metal-olefin complexes. The invention further relates to a fiber-containing agent and a fiber-containing composite material as such.

Fiber-reinforced composite materials, constituting mixed materials, are generally made up of at least two components. In addition to a resin component, such as e.g. an epoxy resin, cyanate resin, or phenol resin, the fiber-reinforced composite materials encompass a fiber component that can be made up, for example, of unidirectional and also woven or short fibers. The fiber component that is used, in combination with the resin component that is used, imparts high strength to the material; fiber-reinforced composite materials are therefore used as composite materials in application areas with stringent requirements in terms of structural material properties, for example in aircraft construction or automobile construction.

For many applications, epoxy resins or mixtures of different epoxy resins are used as a resin component.

Epoxy-based fiber-reinforced composite materials have a comparatively high modulus and a comparatively high glass transition temperature, but they are usually brittle. A number of proposals therefore exist in the prior art for improving the mechanical properties of epoxy-based fiber-reinforced composite materials, in particular in the interlaminar regions of the materials. For example, rubbers, thermoplastics, or specific fillers, etc. are added, often in combination, in order to improve toughness.

U.S. Pat. Nos. 4,783,506 and 4,863,787 disclose a hardenable composition that is based on a polyepoxide resin, an aromatic oligomer, a diamine hardener for the epoxy resin, and a reactive (e.g. carboxyl functionality) solid rubber, the latter being present as non-meltable particles having an average size between 10 µm and 75 µm. Conversion of the rubber into non-meltable particles is preferably achieved, in situ, by removing the solvent from the epoxy/oligomer/rubber mixture while heating it. When the composition is used to form fiber-reinforced composite materials, a large portion of the particles are "filtered" by the fibers and remain on the prepreg surface in order to serve as interlaminar tougheners.

U.S. Pat. Nos. 4,977,215 and 4,972,218 disclose resin systems similar to U.S. Pat. Nos. 4,783,506 and 4,863,787, in which the non-meltable rubber particles have a glass transition temperature above 15° C., a size in the range from 1 µm to 75 µm, and encompass crosslinked carboxylated diene rubbers or carboxylated acrylic rubbers. Once again, when the composition is used to form fiber-reinforced composite materials, a large portion of the particles, if not in fact all the particles, remain on the prepreg surface in order to serve as interlaminar tougheners.

The effectiveness of the interlaminar tougheners is based substantially on maintaining their particulate nature during the hardening process. It is therefore possible to use only those particulate intralaminar tougheners or impact modifying agents that exhibit very low solubility in the resin component, and whose glass transition temperature is not significantly exceeded over a longer period of time during the hardening process.

Given this stipulation, selection of the resin component and of the particulate tougheners is normally subject to narrow parameters, greatly restricting possible formulation leeway and therefore restricting the adaptability of the system to different requirements profiles.

The goal of the present invention was therefore to develop a method for manufacturing epoxy-based fiber-reinforced composite materials that possess particulate interlaminar tougheners in order to improve their mechanical properties, the method not being subject to any narrow limitations with regard to selection of the epoxy resin component and of the intralaminar toughener. Such a method makes possible the manufacture of various fiber-reinforced composite materials that can easily be adapted to different application profiles with different requirements in terms of mechanical structural properties.

The present object is achieved by the method according to the present invention. The use of highly reactive initiators, which contain one or more cationic metal-olefin complexes, makes it possible to carry out hardening of the epoxy resin component in a relatively short period of time at relatively low temperatures. The thermoplastic particles used as interlaminar tougheners thus substantially retain their particulate nature during the hardening process, and thus result in an effective improvement in the toughness properties of the fiber-reinforced composite materials that are manufactured.

The present invention therefore relates to a method for manufacturing a fiber-containing composite material. The method encompasses the following steps:

a) providing fibers, b) treating the fibers with at least one epoxy resin, the epoxy resin comprising at least one initiator that contains one or more cationic metal-olefin complexes, and c) curing the fiber-containing agent obtained in step b), in particular by irradiation with X-radiation, gamma rays, electron beams, and/or UV rays, wherein the fibers provided in step a) are being treated with thermoplastic particles before and/or after step b) is performed, and/or the epoxy resin comprises thermoplastic particles.

It is possible in this context, for example in order to manufacture fiber-reinforced composite materials in the form of laminates, to repeat method steps a) and b) as often as desired before performing method step c).

A further subject of the invention is a fiber-containing agent for manufacturing a fiber-reinforced composite material, containing a) fibers, by preference selected from carbon fibers, aramid fibers, glass fibers, silicon nitride fibers, metal fibers, ceramic fibers, boron fibers, polyethylene fibers, polypropylene fibers, polyester fibers, and/or natural fibers, b) at least one epoxy resin, c) thermoplastic particles, and d) at least one initiator that comprises one or more cationic metal-olefin complexes.

Also a subject of the present invention is a fiber-containing composite material that is manufacturable by means of the method according to the present invention or by hardening the fiber-containing agent according to the present invention.

A "fiber-containing composite material" is, for purposes of the present invention, a mixed material made up of at least two main components that encompasses fibers as a reinforcing component and at least one epoxy resin as a resin component.

Suitable fibers are, in principle, all fibers of natural and synthetic origin that are notable for their high strength and high elongation at fracture. The fibers are by preference selected from carbon fibers, aramid fibers, glass fibers, silicon nitride fibers, metal fibers, ceramic fibers, boron fibers, polyethylene fibers, polypropylene fibers, polyester fibers, and/or natural fibers; flax fibers and sisal fibers are particularly preferred as natural fibers.

Carbon fibers are preferred because they have good specific strength and a good specific modulus of elasticity. All types of carbon fibers can be used in the context of the invention, carbon fibers having high strength and high elongation at fracture being preferred. Carbon fibers having a tensile strength of 4.4 GPa or more, and a tensile elongation of 1.7% or more, are particularly preferred.

In addition to carbon fibers having circular cross sections, fibers having non-round cross sections, for example triangles, squares, hollow shapes, multi-leaf shapes, and H-shapes, can also be used.

Although the arrangement of the fibers is not subject to any special restriction, it may be advantageous for certain intended applications for the fibers to be present in the form of a woven fabric, a mat, a knitted fabric, and/or a braid. Fibers that are arranged in parallel in one direction are best suited for applications that require high strength and a high modulus of elasticity.

An "epoxy resin" is understood in the context of the present invention as a resin composition that is constituted on the basis of epoxy compounds or epoxy-containing compounds, the aforesaid compounds preferably comprising at least two epoxy groups (oxirane rings).

In a preferred embodiment of the invention, the epoxy compounds or epoxy-containing compounds of the epoxy resin system of the polymerizable preparation can encompass both oligomeric and monomeric epoxy compounds as well as epoxies of the polymeric type, and can represent aliphatic, cycloaliphatic, aromatic, or heterocyclic compounds.

Suitable epoxy resins in the context of the present invention are, for example, preferably selected from epoxy resins of the bisphenol A type, epoxy resins of the bisphenol S type, epoxy resins of the bisphenol F type, epoxy resins of the phenol novolac type, epoxy resins of the cresol novolac type, epoxidized products of numerous dicyclopentadiene-modified phenol resins obtainable by the reaction of dicyclopentadiene with numerous phenols, epoxidized products of 2,2',6,6'-tetramethylbisphenol, aromatic epoxy resins such as epoxy resins having a naphthalene basic framework and epoxy resins having a fluorene basic framework, aliphatic epoxy resins such as neopentyl glycol diglycidyl ethers and 1,6-hexanediol diglycidyl ethers, alicyclic epoxy resins such as 3,4-epoxycyclohexylmethyl-3,4-epoxycyclohexane carboxylate and bis(3,4-epoxycyclohexyl)adipate, and epoxy resins having a hetero ring, such as triglycidyl isocyanurate.

The epoxy resins encompass in particular, for example, the reaction product of bisphenol A and epichlorohydrin, the reaction product of phenol and formaldehyde (novolac resins) and epichlorohydrin, glycidyl esters, and the reaction product of epichlorohydrin and p-aminophenol.

Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxphenyl)-1,1-ethane, and 1,5-hydroxpaphthalene.

Further preferred epoxy resins that are commercially obtainable encompass, in particular, octadecylene oxide, epichlorohydrin, styrene oxide, vinylcyclohexene oxide, glycidol, glycidyl methacrylate, diglycidyl ethers of bisphenol A (e.g. those that are obtainable under the commercial designations "Epon 828", "Epon 825", "Epon 1004" and "Epon 1010" of Hexion Specialty Chemicals Inc., "DER-331", "DER-332", "DER-334", "DER-732" and "DER-736" of Dow Chemical Co.), vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, aliphatic epoxide modified with polypropylene glycol, dipentene dioxide, epoxidized polybutadiene (e.g. Krasol products of Sartomer), silicone resins containing epoxide functionality, flame-retardant epoxy resins (e.g. "DER-580", a brominated epoxy resin of the bisphenol type that is obtainable from Dow Chemical Co.), 1,4-butanediol diglycidyl ethers of a phenol/formaldehyde novolac (e.g. "DEN-431" and "DEN-438" of the Dow Chemical Co.), as well as resorcinol diglycidyl ethers (e.g. "Kopoxite" of the Koppers Company Inc.), bis(3,4-epoxycyclohexyl)adipate, 2-(3,4-epoxycyclohexyl-5,5-spiro-3,4-epoxy)cyclohexanemetadioxane, vinylcyclohexene monoxide, 1,2-epoxyhexadecane, alkyl glycidyl ethers such as, for example, C8- to C10-alkyl glycidyl ethers (e.g. "HELOXY Modifier 7" of Hexion Specialty Chemicals Inc.), C12- to C14-alkyl glycidyl ethers (e.g. "HELOXY Modifier 8" of Hexion Specialty Chemicals Inc.), butyl glycidyl ethers (e.g. "HELOXY Modifier 61" of Hexion Specialty Chemicals Inc.), cresyl glycidyl ethers (e.g. "HELOXY Modifier 62" of Hexion Specialty Chemicals Inc.), p-tert-butylphenyl glycidyl ethers (e.g. "HELOXY Modifier 65" of Hexion Specialty Chemicals Inc.), polyfunctional glycidyl ethers such as, for example, diglycidyl ethers of 1,4-butanediol (e.g. "HELOXY Modifier 67" of Hexion Specialty Chemicals Inc.), diglycidyl ethers of neopentyl glycol (e.g. "HELOXY Modifier 68" of Hexion Specialty Chemicals Inc.), diglycidyl ethers of cyclohexanedimethanol (e.g. "HELOXY Modifier 107" of Hexion Specialty Chemicals Inc.), trimethylolethane triglycidyl ethers (e.g. "HELOXY Modifier 44" of Hexion Specialty Chemicals Inc.), trimethylolpropane triglycidyl ethers (e.g. "HELOXY Modifier 48" of Hexion Specialty Chemicals Inc.), polyglycidyl ethers of an aliphatic polyol (e.g. "HELOXY Modifier 84" of Hexion Specialty Chemicals Inc.), polyglycol diepoxide (e.g. "HELOXY Modifier 32" of Hexion Specialty Chemicals Inc.), bisphenol F epoxies (e.g. "EPN-1138" or "GY-281" of Huntsman Int. LLC), 9,9-bis-4-(2,3-epoxypropoxy)phenylfluorenone (e.g. "Epon 1079" of Hexion Specialty Chemicals Inc.).

Further preferred commercially obtainable compounds are selected, for example, from Araldite™ 6010, Araldit™ GY-281™, Araldit™ ECN-1273, Araldit™ ECN-1280, Araldit™ MY-720, RD-2 exists from Huntsman Int. LLC; DEN™ 432, DEN™ 438, DEN™ 485 of Dow Chemical Co., Epon™ 812, 826, 830, 834, 836, 871, 872, 1001, 1031 etc. of Hexion Specialty Chemicals Inc. and HPT™ 1071, HPT™ 1079 likewise of Hexion Specialty Chemicals Inc., as novolac resins furthermore, for example, Epi-Rez™ 5132 of Hexion Specialty Chemicals Inc., ESCN-001 of Sumitomo Chemical, Quatrex 5010 of Dow Chemical Co., RE 305S of Nippon Kayaku, Epiclon™ N673 of DaiNipon Ink Chemistry, or Epicote™ 152 of Hexion Specialty Chemicals Inc.

In a special embodiment of the present invention, mixtures of several of the aforesaid epoxy resins can also be used.

The thermoplastic particles used in the context of the method according to the present invention preferably make possible targeted impact toughness modification of the interlaminar regions of the fiber-containing composite material that is manufactured; any mixtures of different thermoplastic particles can also be used.

A "thermoplastic particle" is understood for purposes of the present invention as a particulate element, solid at 20° C. and 1013 mbar, that is made up substantially or completely of one, or a mixture of different, thermoplastic polymer(s).

A "thermoplastic polymer" is to be understood as a substance whose external shape can be deformed above a specific temperature, without the occurrence of material decomposition of the polymer at that temperature.

In an embodiment of the invention, the thermoplastic particles have a glass transition temperature, determined by means of dynamic mechanical analysis (DMA), of at least 45° C. Thermoplastic particles having a glass transition temperature of at least 45° C. offer the advantage, as compared with a lower glass transition temperature, that they are better able to retain their particulate nature despite the thermal stress during the hardening process, and thus bring about more effective toughness modification, in particular better interlaminar toughness modification.

Thermoplastic particles that have a glass transition temperature from 55° C. to 280° C., by preference from 65° C. to 250° C., particularly preferably from 75° C. to 220° C., and in particular a glass transition temperature from 95° C. to 200° C., are used in particular in the context of the present invention.

For certain applications, however, it may also be useful for the glass transition temperature of the thermoplastic particles that are used to be between 25° C. and 45° C.

The glass transition temperature is investigated in the context of the present invention by means of dynamic mechanical analysis (DMA). Using DMA, the storage modulus G', loss modulus G", and loss factor tan δ are ascertained as a function of temperature. From these variables, the softening temperature of the polymers can be determined. The glass transition temperature is determined from the Tg peak at which tan δ (the loss factor) reaches a maximum.

The lower limit of the size of the thermoplastic particles is defined on the one hand by their manufacturability and on the other hand by their influence on the material properties of the fiber-reinforced composite material. The thermoplastic particles on the one hand must not be too large, in order to ensure they can be applied and homogeneously distributed; but also not too small, so that in the context of the requisite application quantity there are not too many individual particles, which can prevent the formation of a stable composite material.

A technically useful lower limit for the average particle size of the thermoplastic particles is 1 µm, by preference 10 µm, and in particular 20 µm. The upper limit on the particle size is 500 µm, by preference 100 µm, and in particular 50 µm.

The average particle size (D 50 volume average) of the thermoplastic particles can be determined using ordinary methods, for example by light scattering. In this context, "particles" are to be understood as those particulates that are present in dispersed fashion in the epoxy resin or in a manner distributed over the fiber surface. These can represent agglomerates of smaller units. The D 50 volume average is that point in the particle size distribution at which 50 vol % of the particles have a smaller diameter and 50 vol % of the particles have a larger diameter.

It is particularly preferred that at least 90%, in particular at least 95%, of the thermoplastic particles, based on the total number of thermoplastic particles, have a maximum extension in any spatial direction of less than 100 µm, by preference less than 70 µm, and in particular less than 50 µm.

It is further preferred that at least 90% of the thermoplastic particles, based on the total number of thermoplastic particles, have a minimum extension in any spatial direction of more than 10 µm, by preference more than 20 µm, and in particular more than 30 µm.

The maximum and minimum extension of the thermoplastic particles in any spatial direction can be obtained by statistical evaluation of (electron-) microscope images.

The thermoplastic particles of the present invention can be made of or encompass one, or a mixture of, several suitable material(s). Suitable materials are, for example, solid rubbers such as polybutadiene, styrene-butadiene rubber, butadiene-acrylonitrile rubber, EPDM, synthetic or natural isoprene rubber, butyl rubber, or polyurethane rubber. Partly crosslinked solid rubbers based on isoprene-acrylonitrile copolymers or butadiene-acrylonitrile copolymers are particularly suitable.

The thermoplastic particles can also encompass, or be made up of, block copolymers, for example those in which at least one polymer block has a glass temperature below 20° C. (by preference below 0° or below −30° C. or below −50° C.), for example a polybutadiene block or a polyisoprene block. At least one further block of the block copolymer has a glass temperature above 20° C. (by preference above 50° C. or above 70° C.), for example a polystyrene block or a polymethyl methacrylate block. Concrete examples that may be recited are: styrene-butadiene-methyl methacrylate block copolymers, methyl methacrylate-butadiene-methyl methacrylate block copolymers, and butadiene-methyl methacrylate block copolymers.

Also preferred are block copolymers that contain both an aromatic polymer block and an aliphatic polymer block. The aromatic polymer block can be, for example, a polystyrene block. The aliphatic polymer block can be, for example, a polybutadiene block or a polyisoprene block. Block copolymers having an (aromatic polymer block-aliphatic polymer block-aromatic polymer block) structure are particularly preferred. Styrene-isoprene-styrene (SIS) block copolymers are particularly suitable for this. Of these in turn, those SIS copolymers that have a styrene content in the range from approximately 18 to approximately 25 wt % are preferred. SIS block copolymers of this kind are obtainable, for example, under the commercial name Hybrar™ of Kururay Europe GmbH. The isoprene block in this context can be entirely or partly hydrogenated, with the result that the number of carbon-carbon double bonds originally present is decreased, and the thermal stability of the block copolymer is thereby increased.

In a special embodiment of the invention, the thermoplastic particles are made of polysulfones, polyethersulfones, polyetherketones, polybutylene terephthalates, polycarbonates, polyetherimides, polyalkylenes, polyamides, polyesters, polyamide-imides, polyaryl ethers, and/or polyarylates; polysulfones and/or polyethersulfones are particularly preferred.

The thermoplastic particles can be manufactured, for example, by means of a high-speed rotor mill; in the case of thermoplastic particles that are difficult to grind, it is useful to embrittle the particles before the grinding operation (e.g. by adding liquid nitrogen prior to grinding). Suitable thermoplastic particles are obtainable, for example, as commercial products under the trade names Virantage™ Polyethersulfone, Virantage™ Polyphenylsulfone, Virantage™ Polyamide-imide, Virantage™ Polyetheretherketones, Virantage™ Polyphenylene Sulfides, Virantage™ of Solvay Advanced Polymers, LLC, Ultrason® E polyethersulfone, Ultrason® S polysulfone, Ultrason® P polyphenylsulfone of BASF SE.

In accordance with the method according to the present invention, the fibers provided in the first method step (step a) are treated with thermoplastic particles before and/or after performance of the second method step (step b), i.e. after treatment of the fibers with at least one epoxy resin that encompasses at least one initiator that contains one or more cationic metal-olefin complexes. The aforesaid epoxy resin can itself contain thermoplastic particles.

The term "treat" is understood, for purposes of the present invention, as an operation in which at least two substances are brought into contact with one another. For example, "treatment" of the fibers with the at least one epoxy resin is to be understood to mean that the fibers are impregnated with the epoxy resin or that a film of the epoxy resin is applied onto the fiber surface and/or onto the fabric surface.

For the case in which the fibers provided are treated with the thermoplastic particles before and/or after performance of the second method step, the thermoplastic particles can be distributed as homogeneously as possible on a surface, for example on the surface of a prepreg or of a fiber fabric.

In an embodiment of the method according to the present invention, after treatment of the fibers with the at least one epoxy resin that encompasses at least one initiator that contains one or more cationic metal-olefin complexes, the thermoplastic particles are distributed as homogeneously as possible onto the fibers thus treated. The fibers are present, in this context, in particular in the form of a woven fabric, a mat, a knitted fabric, and/or a braid.

In a further embodiment of the method according to the present invention, before treatment of the fibers with the at least one epoxy resin that encompasses at least one initiator that contains one or more cationic metal-olefin complexes, the thermoplastic particles are distributed onto the fibers as homogeneously as possible. The fibers are present, in this context, in particular in the form of a woven fabric, a mat, a knitted fabric, and/or a braid.

As an alternative thereto, before and after treatment of the fibers with the at least one epoxy resin that encompasses at least one initiator that contains one or more cationic metal-olefin complexes, the thermoplastic particles of the present invention can be distributed as homogeneously as possible on the fabric surface resp. on the resin-treated fabric surface.

The procedure described offers the advantage that the thermoplastic particles of the present invention are not present in a manner dispersed in the epoxy resin. Agglomeration tendencies of the thermoplastic particles, and undesired local concentration thereof on specific fibers and/or fiber layers as a result of fiber-related filter effects, are thereby minimized.

In a special embodiment of the invention, the quantity of thermoplastic particles applied on the surface of a fabric and/or prepreg formed from the fibers of the present invention is between 5 and 50 g/m², by preference between 10 and 40 g/m², particularly preferably between 12 and 30 g/m², and greatly preferably between 15 and 25 g/m².

As already stated above, the at least one initiator used in the present invention contains one or more cationic metal-olefin complexes.

A "cationic metal-olefin complex" is understood for purposes of the present invention as a complex that encompasses one or more metal cation(s) as (a) central atom(s) and at least one olefin as coordinating ligands. Those cationic metal-olefin complexes that comprise exclusively olefin ligands as coordinating ligands are particularly preferred.

In a preferred embodiment of the invention, at least one metal in the cationic metal-olefin complex is selected from silver, cobalt, copper, aluminum, or titanium; silver and copper are particularly preferred. By preference, all the metals in the cationic metal-olefin complex are selected from silver, cobalt, copper, aluminum, or titanium. The metal-olefin complex can also contain several of the metals recited above as central atoms.

In a further embodiment of the present invention, at least one olefin in the cationic metal-olefin complex is selected from propene, 1-butene, 1-pentene, 1-hexene, 1-octene, 1-decene, isoprene, norbornene, cyclohexene, cyclooctene, cyclodecene, 1,4-cyclohexadiene, 4-vinylcyclohexene, trans-2-octene, styrene, 5-norbornene-2-carboxylic acid, butadiene, 1,5-hexadiene, 1,6-heptadiene, 1,7-octadiene, 1,9-decadiene, sorbic acid ethyl ester, 1,3-cyclohexadiene, 1,3-cyclooctadiene, 1,5-cyclooctadiene, norbornadiene, dicyclopentadiene, cycloheptatriene, trans,trans,trans-1,5,9-cyclododecatriene, trans,trans,cis-1,5,9-cyclododecatriene, cyclooctatetraene, squalene, diallyl carbonate, diallyl ether, diallyldimethylsilane, cyclopentadiene, ethyl vinyl ether, limonene, 1,2-dihydronaphthalene, cinnamic acid ethyl ester, ethyl acrylate, ethyl methacrylate, stilbene, oleic acid methyl ester, or linolenic acid methyl ester.

By preference, all the olefins in the cationic metal-olefin complex are selected from the olefins recited above. The metal-olefin complex can also contain several of the olefins recited above as olefin ligands.

Care must be taken in this context that the initiator itself has a neutral overall charge, by the fact that the resulting positive charge of all the cationic metal-olefin complexes is balanced by a corresponding number of anions having the respectively corresponding charge. Weakly coordinating anions are particularly preferred as anions.

For a definition of the term "weakly coordinating anion," the reader is referred to Hollemann-Wiberg, Lehrbuch der Anorganischen Chemie [Textbook of inorganic chemistry], 101st edition, Walter de Gruyter Berlin N.Y., 1995, pp. 1654-1655.

The initiator therefore contains, in addition to one or more cationic metal-olefin complexes, one or more anions that by preference are selected from hexafluoroantimonate ($SbF_6^-$), hexafluorophosphate ($PF_6^-$), boron tetrafluoride ($BF_4^-$), hexafluoroaluminate ($AlF_6^{3-}$), trifluoromethanesulfonate ($CF_3SO_3^-$), nitrate ($NO_3^-$), hexafluoroarsenate ($AsF_6^{3-}$), tetrakis(pentafluorophenylborate) ($B[C_6F_5]_4^-$), tetrakis[3.5-bis(trifluoromethyl)phenyl]borate ($B[C_6H_3(CF_3)_2]_4^-$), tetraphenylborate ($B[C_6H_5]_4^-$), hexafluorotitanate ($TiF_6^{2-}$), hexafluorogermanate ($GeF_6^{2-}$), hexafluorosilicate ($SiF_6^{2-}$), hexafluoronickelate ($NiF_6^{2-}$), and/or hexafluorozirconate ($ZrF_6^{2-}$). A particularly preferred anion for purposes of the present invention is hexafluoroantimonate ($SbF_6^-$).

Preferred initiators of the present invention are described by the general formula (I)

$$\{[M(L)_a]X_b\}_n \qquad \text{formula (I)},$$

where M=metal cation, L=olefin ligand, X=anion, by preference selected from the group of the weakly coordinating anions, a=1 to 10, preferably 1 to 6, particularly preferably 1 to 4,
b=1 to 10, preferably 1 to 6, particularly preferably 1 to 3,
n=from 1 to 20,000,000, where a, b, and n can represent both whole numbers and number ranges, and a can additionally represent non-whole numbers.

In particular, a is a number from 1 to 6, particularly preferably from 1 to 4. With further preference, a=1, 1.5, 2, 3, or 4, very particularly preferably 1, 1.5, or 2.

In particular, b is a number from 1 to 6, particularly preferably from 1 to 3. With further preference, b=1, 2, 3, or 4, very particularly preferably 1, 2, or 3.

n is preferably either 1 (monomeric metal complex), or is preferably in a range from 2 to 20,000,000 (monomeric, dimeric, trimeric, oligomeric, and polymeric coordination compounds or mixtures thereof), for example preferably 1 to 20,000, particularly preferably 1 to 1000, very particularly preferably 1 to 500 or 1 to 300.

The metal cation M is by preference selected from silver, cobalt, copper, aluminum, or titanium, with silver and copper being particularly preferred, while the olefin ligand L and anion X are preferably selected from one or more of the olefins resp. anions recited above.

Be it noted that the structure of the initiators of the present invention is substantially influenced by the selection of the olefin ligand and/or of the anion.

Thanks to the use of multifunctional olefin ligands such as, for example, dienes, trienes, or oligoalkenes, the initiator can encompass metal-olefin complexes that comprise a dimeric, trimeric, or oligomeric structure or are present as coordination polymers. In the case of cyclic di-, tri-, or tetraenes (e.g. 1,5-cyclooctadiene, cycloheptatriene, or cyclooctatetraene), mononuclear metal-olefin complexes are preferably predominantly obtained. The formation of polynuclear ligand-bridged structures is, however, also possible. If open-chain dienes are used as olefin ligands, the formation of coordination polymers can be favored.

In a preferred embodiment of the invention, the initiator contains at least five, by preference at least 10, and greatly preferably at least 50 or at least 100 identical or different metal cations that, by way of bridging olefin ligands having at least two carbon-carbon double bonds, constitute a cationic coordination copolymer.

"Bridging olefin ligands" are to be understood in particular as dienes, for example butadiene, 1,5-hexadiene, 1,6-heptadiene, 1,7-octadiene, and/or 1,9-decadiene.

In particular, the initiator contains at least five, by preference at least 10, and greatly preferably at least 50 or at least 100 identical metal cations that, by way of bridging olefin ligands having at least two carbon-carbon double bonds, constitute a cationic coordination copolymer, the aforesaid olefin ligands encompassing 4 to 12 carbon atoms.

A cationic coordination polymer of this kind having a one-dimensional chain structure is obtained, for example, when silver hexafluoroantimonate is reacted with 1,7-octadiene. The resulting metal-olefin complex has the following general formula (II)

$$\{[Ag(1,7\text{-octadiene})_{1.5}]SbF_6\}_{5\text{-}p} \quad \text{Formula (II)},$$

where p=20,000,000.

As is evident from formula (II), the silver metal cations are alternately bridged by one and two molecules of 1,7-octadiene, so that in the present case, for example, a metal-olefin complex of formula (III) can be formed as a cationic polymer are obtained by using olefin ligands that comprise more than two carbon-carbon double bonds.

In a preferred embodiment of the invention, the initiator is selected from $[Ag(cyclohexene)_{1\text{-}4}]SbF_6$, $[Ag(cyclooctene)_{1\text{-}4}]SbF_6$, $[Ag(trans\text{-}2\text{-}octene)_{1\text{-}4}]SbF_6$, $[Ag(styrene)_{1\text{-}4}]SbF_6$, $[Ag(5\text{-}norbornene\text{-}2\text{-}carboxylic\ acid)_{1\text{-}4}]SbF_6$, $\{[Ag(1,5\text{-}hexadiene)_{1\text{-}4}]SbF_6\}_{1\text{-}p}$, $\{[Ag(1,7\text{-}octadiene)_{1.5}]SbF_6\}_{1\text{-}p}$, $\{[Ag(1,9\text{-}decadiene)_{1\text{-}4}]SbF_6\}_{1\text{-}p}$, $\{[Ag(sorbic\ acid\ ethyl\ ester)_{1\text{-}4}]SbF_6\}_{1\text{-}p}$, $\{[Ag(1,3\text{-}cyclohexadiene)_{1\text{-}4}]SbF_6\}_{1\text{-}p}$, $\{[Ag(1,3\text{-}cyclooctadiene)_{1\text{-}4}]SbF_6\}_{1\text{-}p}$, $Ag(1,5\text{-}cyclooctadiene)_2]SbF_6$, $\{[Ag(norbornadiene)_{1\text{-}4}]SbF_6\}_{1\text{-}p}$, $\{[Ag(dicyclopentadiene)_{1\text{-}4}]SbF_6\}_{1\text{-}p}$, $\{[Ag(cycloheptatriene)_{1\text{-}4}]SbF_6\}_{1\text{-}p}$, $\{[Cu(1,7\text{-}octadiene)_{1\text{-}4}]SbF_6\}_{1\text{-}p}$, $[Cu(1,5\text{-}cyclooctadiene)_2]SbF_6$, $[Ag(allyl\ glycidyl\ ether)_{1\text{-}4}]SbF_6$, $\{[Ag(trans,trans,cis\text{-}1,5,9\text{-}cyclododecatriene)_{1\text{-}4}]SbF_6\}_{1\text{-}p}$, $\{[Ag(trans,trans,trans\text{-}1,5,9\text{-}cyclododecatriene)_{1\text{-}4}]SbF6\}_{1\text{-}p}$, $\{[Ag(cyclooctatetraene)_{1\text{-}4}]SbF_6\}_{1\text{-}p}$, $\{[Ag(squalene)_{1\text{-}4}]SbF_6\}_{1\text{-}p}$, where p=20,000,000.

For purposes of the present invention, any mixtures of the aforesaid initiators can also be used.

Manufacture of the above-described initiators may be gathered, by way of example, from WO 2008/064959 A2.

In an embodiment, the initiator is dispersed and/or dissolved in the epoxy resin of the present invention, the total quantity of the initiator or the total quantity of the mixture of different initiators by preference accounting for 0.01 to 10 wt %, preferably 0.5 to 3 wt %, and particularly preferably 1 to 2 wt % of the total quantity of the epoxy resin or the total quantity of the mixture of different epoxy resins.

For specific application purposes, it may be useful in the context of the present invention to use, alongside the initiators described above, further initiators, in particular photoinitiators.

Suitable photoinitiators are, for example, benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, β-diacetylbenzene, 4-aminobenzophenone, 4'-methoxyacetophenone, β-methylanthraquinone, tert-butylanthraquinone, anthraquinone carboxylic acid ester, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin Formula (III)

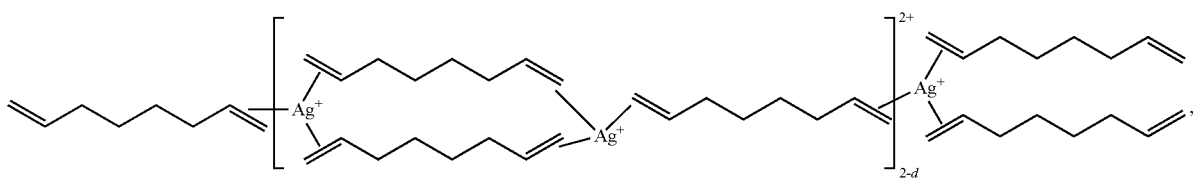

where p=9,999,999.

The olefin ligands 1,5-hexadiene and 1,9-hexadiene yield, by preference, similar structures. More complex structures methyl ether, benzoin ethyl ether, benzoin butyl ether, benzoin isopropyl ether, 7-H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzyl ketals such as benzyl dimethyl ketal, 2-methyl-1-[4-(methylthio)phenyl]-2-morpholinopropan-1-one, anthraquinone such as 2-methylanthraquinone, 2-ethylanthraquinone, 2-tert-butylanthraquinone, 1-chloroanthraquinone, 2-amylanthraquinone, and 2,3-butanedione, 2,4,6-trimethylbenzoyldiphenylphosphine oxide (Lucirin® TPO of BASF AG), ethyl-2,4,6-trimethylbenzoylphenylphosphinate (Lucirin® TPO L of BASF AG), bis-(2,4,6-trimethylbenzoyl)phenylphosphine oxide (Irgacure® 819 of Ciba Specialty Chemicals), benzophenones, hydroxyacetophenones, phenylglyoxylic acid and derivatives thereof, or mixtures of these photoinitiators.

By preference, the above-described photoinitiator is dispersed and/or dissolved in the epoxy resin of the present invention, the total quantity of the photoinitiator or the total quantity of the mixture of different photoinitiators accounting for by preference 0.001 to 5 wt %, preferably 0.01 to 3 wt %, and particularly preferably 0.11 to 2 wt % of the total quantity of the epoxy resin or the total quantity of the mixture of different epoxy resins.

Although thermal hardening is possible for purposes of the present invention, it is particularly preferred in the context of the present invention that the curing carried out in the method according to the present invention, and/or the hardening of the fiber-containing agent according to the present invention to yield the fiber-reinforced composite material, occur non-thermally.

A particular advantage of non-thermal hardening is that because of the high reactivity of the initiators used, effective hardening can already be brought about at relatively low temperatures in relatively short periods of time. The result is that there is only a very low level of thermal stress on the respective agent, so that the thermoplastic particles retain their particulate nature during the hardening operation. As stated above, the particulate nature of the thermoplastic particles brings about particularly effective intralaminar toughness modification of the fiber-containing composite material of the present invention.

The curing carried out in the method according to the present invention, and/or the curing of the fiber-containing agent according to the present invention to yield the fiber-reinforced composite material, can occur in particular non-thermally.

"Non-thermally" is understood in the present invention as hardening initiated by radiation, a thermal initiation brought about by specifically and actively delivered thermal energy not being encompassed. Thermal energy can be released by the radiation-initiated hardening and can result in or contribute to complete hardening of the respective agent (so-called post-hardening).

Hardening by preference occurs by means of electromagnetic irradiation. In particular, radiation having a wavelength from 10 pm to 1 mm, by preference from 50 pm to 780 nm, particularly preferably from 100 pm to 200 nm, is used, for example X-radiation, gamma rays, electron beams, UV radiation.

For purposes of the present invention, however, hardening can also occur by means of microwave radiation.

Those initiators that are suitable for initiating and/or accelerating non-thermal hardening of an epoxy resin are therefore particularly preferred. In the case of an electromagnetic irradiation, these initiators initiator and/or accelerate the hardening of the respective agent preferably by forming reactive cationic species, and because of their interaction with the electromagnetic radiation are by preference also referred to as "photoinitiators."

No special limitations exist for purposes of the present invention in terms of the radiation source used in the context of non-thermal hardening.

A mercury lamp, a halogen lamp, but also monochromatic radiation in the form of lasers, can preferably be used as a source for UV radiation.

If hardening occurs with the use of UV radiation, the UV hardening preferably takes place by means of short-wave ultraviolet irradiation in a wavelength region from 200 to 450 nm, in particular using high- or medium-pressure mercury lamps at a power level from 80 to 240 W/cm.

As examples of the source of electron beams, a system for utilizing thermal electrons generated by commercially obtainable tungsten filaments, a cold cathode method that generates electron beams by passing a high-voltage pulse through a metal, and a secondary electron method that uses secondary electrons generated by the collision of ionized gas molecules and a metal electrode, can be utilized. Fissionable substances such as $Co^{60}$ can be used as a source of alpha radiation, beta radiation, and gamma rays. For gamma rays, a vacuum tube that brings about the collision of an accelerated electron with an anode can be used. The radiation can be used either individually or in a combination of two or more radiation types. In the latter case, two or more radiation types can be used either simultaneously or at specific time intervals.

Hardening with the use of radiation, in particular electron beams, is carried out by preference at 20 to 250° C., preferably at 80 to 100° C., in a time period from 5 seconds to 12 hours, preferably 8 seconds to 4 hours, very particularly preferably 10 seconds to 1 hour, and/or with rays having a radiation energy from 3 eV to 25 MeV, in particular from 6 eV to 20 MeV, preferably from 1 keV to 15 MeV, very particularly preferably from 1 keV to 10 MeV.

In a preferred embodiment of the invention, hardening occurs with at least one freely selectable irradiation unit from 1 to 1000 kGy, by preference from 1 to 300 kGy, particularly preferably from 10 to 200 kGy.

In a further preferred embodiment of the invention, a combination of thermal and/or non-thermal hardening can be performed; the sequence of the thermal and the non-thermal hardening step is freely selectable and can be adapted to the corresponding application profile or application purpose.

If it should be advantageous to carry out thermal and/or non-thermal hardening with oxygen excluded, hardening can also occur under an inert gas atmosphere. In principle, any gas that behaves inertly with respect to the chemicals being used is suitable. Possibilities in this regard are, by preference, gases such as $N_2$, $CO_2$, or argon. Inexpensive gases such as $CO_2$ and $N_2$ are, however, preferred in this context. $CO_2$ has the advantage that is collects at the bottom of vessels and is thus easy to handle. Suitable inert gases are, in particular, non-toxic and nonflammable.

The method according to the present invention can by preference be based on all generally known methods for the manufacture of fiber-containing composite materials. For example, the method according to the present invention can be carried in the form of a manual layup method, a prepreg method, an infusion method, an RTM method, an extrusion method, and/or a winding method.

By preference, the method according to the present invention is carried out in the form of an RTM method, in which the liquid epoxy resin, which contains at least one initiator that encompasses one or more metal-olefin complexes, is sprayed into a substrate made of fibers that is located in any mold. By preference, the aforesaid fibers are already treated, before injection of the epoxy resin, with the thermoplastic particles according to the present invention, with the result that particularly good intralaminar toughness modification is achieved. Hardening then occurs, with the result that the fiber-reinforced composite material is manufactured. For the reasons recited above, it is particularly advantageous in this context to carry out a non-thermal hardening operation.

In an embodiment of the method, fiber-containing composite materials that have an interlaminar mode I energy release rate GIc from 100 J/m$^2$ to 800 J/m$^2$, by preference from 150 J/m$^2$ to 600 J/m$^2$, and in particular from 200 to 590 J/m$^2$ are obtained.

The interlaminar mode I energy release rate GIc can be determined in accordance with DIN EN 6033. Double cantilever beam (DCB) test specimens are cut out of fiber composite laminates. Two aluminum blocks are adhesively bonded onto the two surfaces of the DCB specimen, alongside an initial crack. After accurate measurement of the specimen, it is clamped into a tensile testing machine and loaded. The progress of the crack is observed with a microscope over the entire experimental period. The force-displacement diagram is plotted during the experiment in order to determine the interlaminar mode I energy release.

In a further embodiment of the method, fiber-containing composite materials that have an interlaminar mode II energy release (GIIc) from 200 J/m$^2$ to 2000 J/m$^2$, by preference from 300 J/m$^2$ to 1500 J/m$^2$, and in particular from 400 to 1000 J/m$^2$ are obtained.

The interlaminar mode II energy release (GIIc) can be determined in accordance with DIN EN 6034. End-notched flexure (ENF) specimens are manufactured from fiber composite laminates. The ENF test is carried out on a three-point bending apparatus. The progress of the crack is observed with a microscope. During the experiment, a force-displacement diagram is plotted in order to determine the interlaminar mode II energy release rate.

Further agents can be used resp. contained in the method according to the present invention and in the fiber-containing agent according to the present invention, selected by preference from plasticizers, fillers, further additive resins, stabilizers, hardener accelerators, antioxidants, adhesion promoters, rheology modifiers, thickeners, binders, solvents, catalysts, reactive diluents, flame protection additives, and/or further impact toughness modifying agents.

Suitable plasticizers are, for example, by preference esters such as abietic acid esters, adipic acid esters, azelaic acid esters, benzoic acid esters, butyric acid esters, acetic acid esters, phosphoric acid esters, phthalic acid esters; esters of higher fatty acids having approximately 8 to approximately 44 carbon atoms, such as dioctyl adipate, diisodecyl succinate, dibutyl sebacate or butyl oleate, esters of OH— group-carrying or epoxidized fatty acids, fatty acid esters, and fats, glycolic acid esters, phosphoric acid esters, phthalic acid esters of linear or branched alcohols containing 1 to 12 carbon atoms such as, for example, dioctyl phthalate, dibutyl phthalate, or butylbenzyl phthalate, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof. The asymmetrical esters of the difunctional aliphatic dicarboxylic acids are particularly suitable, for example the esterification product of adipic acid monooctyl ester with 2-ethylhexanol (Edenol DOA, Henkel Co., Düsseldorf).

Also suitable as plasticizers are, preferably, the pure or mixed ethers of monofunctional, linear, or branched C4 to 16 alcohols or mixtures of two or more different ethers of such alcohols, for example dioctyl ether (obtainable as Cetiol OE, Henkel Co., Düsseldorf).

In a further preferred embodiment, end-capped polyethylene glycols are used as plasticizers, for example polyethylene or polypropylene glycol di-C1 to 4-alkyl ethers, in particular the dimethyl or diethyl ethers of diethylene glycol or dipropylene glycol, as well as mixtures of two or more thereof.

Inorganic fillers are suitable, for example, as fillers, e.g. naturally occurring or synthetic materials such as, for example, quartz, nitrides (e.g. silicon nitride), glasses derived e.g. from Ce, Sb, Sn, Zr, Sr, Ba, and Al, colloidal silicon dioxide, feldspar, borosilicate glasses, kaolin, talc, titanium dioxide, and zinc glasses, as well as sub-micron-size silicon dioxide particles (e.g. pyrogenic silicon dioxides such as, for example, the silicon dioxides of the "Aerosil" "OX 50", "130", "150", and "200" series that are sold by Degussa, as well as "Cab-O-Sil M5" that is sold by Cabot Corp.), aluminum silicates, magnesium silicates, zeolites, bentonites, ground mineral substances, calcium carbonates, quartz dust, silicic acid anhydride, silicon hydrate or carbon black, magnesium carbonate, fired clay, clay, iron oxide, zinc oxide, titanium dioxide, cellulose, wood flour, mica, chaff, graphite, fine aluminum powder or flint powder, glass spheres, glass powder, glass fiber and chopped glass fibers, as well as further inorganic fillers known to one skilled in the art, as well as organic fillers, in particular chopped fibers or hollow plastic spheres, as well as functional fillers that positively influence rheological properties, for example highly dispersed silicic acid, in particular having a low BET surface area from 20 to 150, preferably 30 to 100, particularly preferably approximately 50 m$^2$/g.

Suitable additive resins are, for example, benzoxazine resins, phenol resins, polyethersulfones, polyurethane resins, acrylate resins, cyanoacrylate resins, triazine resins, and/or polyimide resins.

Included among the stabilizers or antioxidants usable in the context of the invention as additives are hindered phenols of high molecular weight ($M_w$), polyfunctional phenols, and sulfur- and phosphorus-containing phenols. Phenols usable in the context of the invention as additives are, for example, 1,3,5-trimethyl-2,4,6-tris(3,5-di-tert-butyl-4-hydroxybenzyl)benzene; pentaerythritol tetrakis-3-(3,5-di-tert-butyl-4-hydroxyphenyl)propionate; n-octadecyl-3,5-di-tert-butyl-4-hydroxyphenyl)propionate; 4,4-methylenebis(2,6-di-tert-butylphenol); 4,4-thiobis(6-tert-butyl-o-cresol); 2,6-di-tert-butylphenol; 2,4-dimethyl-6-tert-butylphenol, 2,2'-methylene-bis-(4-methyl-6-tert-butylphenol); 4,4'-butylidene-bis-(3-methyl-6-tert-butylphenol); 4,4'-thiobis (3-methyl-6-tert-butylphenol); 2,6-di-tert-butyl-p-cresol; 6-(4-hydroxphenoxy)-2,4-bis(n-octylthio)-1,3,5-triazine; tetrakis[methylene-3-(3,5-di-tert-butyl-4-hydroxphenyl) propionate]methane; 1,1,3-tris(2-methyl-4-hydroxy-4-tert-butylphenyl)butane; di-n-octadecyl-3,5-di-tert-butyl-4-hydroxybenzylphosphonate; 2-(n-octylthio)ethyl-3,5-di-tert-butyl-4-hydroxybenzoate; and sorbitol hexa[3-(3,5-di-tert-butyl-4-hydroxyphenyl)propionate].

Suitable photostabilizers are, for example, those obtainable commercially under the name Thinuvin® (manufacturer: Ciba Geigy).

Suitable stabilizers, which are typical UV absorbers and represent light stabilizers, can likewise be contained, selected by preference from the groups of the oxanilides, triazines, and benzotriazoles (the latter obtainable as Tinuvin® brands of Ciba Specialty Chemicals) and benzophenones, or combinations thereof. It may be advantageous to add light stabilizers that do not absorb UV light.

Suitable UV absorbers and light stabilizers can be selected, for example, from 2-hydroxybenzophenones, for example the 4-hydroxy, 4-methoxy, 4-octyloxy, 4-decyloxy, 4-dodecyloxy, 4-benzyloxy, 4,2',4'-trihydroxy, and 2'-hydroxy-4,4'-dimethoxy derivatives, as well as esters of substituted and unsubstituted benzoic acids such as, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

EXEMPLIFYING EMBODIMENTS

1. Manufacturing the Initiator

Synthesis of the initiators encompassing at least one cationic metal-olefin complex occurs on the basis of methods known in the literature (H. W. Qinn, R. L. Van Gilder, *Can. J. Chem.* 1970, 48, 2435; A. Albinati, S. V. Meille, G. Carturan, *J. Organomet. Chem.* 1979, 182, 269; H. Masuda, M. Munakata, S. Kitagawa, *J. Organomet. Chem.* 1990, 391, 131; A. J. Canty, R. Colton, *Inorg. Chim. Acta* 1994, 220, 99). In this, $AgSbF_6$ (Aldrich, 98%; or Chempur, 95+%) is dissolved in toluene or THF and reacted with an excess of alkene, by preference four equivalents. The high molecular weight metal-olefin complexes thus obtained, of the $\{[Ag(alkene)_a]SbF_6\}_{100-p}$ type where p assumes a value between 101 and 20,000,000, are poorly soluble and precipitate out of the reaction mixture, and can then be isolated by filtration. The substances are then dried under high vacuum.

In the case of further metals and ligands, firstly the respective metal chloride is reacted with $AgSbF_6$ in a suitable solvent such as e.g. methanol, the precipitated AgCl is removed by filtration, and the resulting solution of the metal hexafluoroantimonate is reacted with the respective ligand. The solvent is then removed and the compound is dried under high vacuum.

2. Manufacturing the Resin Formulation

Substances Used:

| | |
|---|---|
| DEN431 | Epoxy resin, phenol novolac type (Dow Chemicals) |
| DEN438 | Epoxy resin, phenol novolac type (Dow Chemicals) |
| PES Radel A-704 | Polyethersulfone (Solvay) |
| EP2240A | Core-shell material: silicone rubber particles having an organic casing structure (Nanoresins) |

The resins resp. resin formulations, which are liquid, viscous, or solid at room temperature (54.95 wt % DEN431+ 23.55 wt % DEN438+15 wt % PES Radel A-704+5 wt % EP2240A), are mixed at room temperature with the corresponding initiator (see above; 1.5 wt % $\{[Ag(1,7\text{-octadiene})1.5]SbF_6\}_{1-p}$), heated to a maximum of 80° C., and stirred until the initiator is completely dissolved in the resin. It is then cooled to room temperature.

3. Manufacturing the Fiber-Containing Composite Material

Fiber-containing composite materials are manufactured using HTA carbon fibers (Toho Tenax) as a fiber component and the resin formulation recited above as a resin component, as follows:

Firstly, a film of resin having a surface weight of 80 g/m$^2$ is generated using a model ZP 25008 melt adhesive application device (Inatec company). A prepreg having a fiber volume proportion of approximately 60% is then obtained by processing the resin film using a model MDW 100-2 prepreg winding system (Microsam company).

Unidirectional laminates having a layer thickness of 3 mm are manufactured by laying 12 unidirectional prepregs onto one another, the individual prepregs being obtained in accordance with the procedure described above. For manufacture of the laminates, after each new prepreg ply is placed onto a vacuum table a vacuum is applied to it in order to reduce the porosity of the material. For the case according to the present invention, in which thermoplastic particles are used as interlaminar tougheners, the corresponding thermoplastic particles are scattered onto the surface of each individual prepreg ply before the next prepreg ply is laid on, so that the application quantity indicated in Table 1 is obtained. In the present case, polyethersulfone particles of the Virantage™ type (Solvay Advanced Polymers, LLC), having an average particle diameter of approx. 50 μm, are used as thermoplastic particles.

The laminates are then deaerated by means of a vacuum bag, and passed through an electron beam unit (10 MeV); hardening occurs in four steps, in each of which a dose of 33 kGy is introduced (132 kGy total). For better release of the hardened laminates (i.e. the fiber-containing composite materials) from the mold, they are first coated with a thin layer of Frekote-700NC (Henkel Loctite) as a release agent.

4. Mechanical Data for the Fiber-Containing Composite Materials

The interlaminar mode I energy release (GIc) is determined in accordance with DEN EN 6033. Two aluminum blocks are adhesively bonded onto the two surfaces of the double cantilever beam (DCB) specimen alongside an initial crack. After accurate measurement of the specimen, it is clamped into a tensile testing machine and loaded. The progress of the crack is observed with a microscope over the entire experimental period. During the experiment, the force-displacement diagram is plotted in order to determine the interlaminar mode I energy release. A universal testing machine (UPM) of the Zwick company (model Z 2.5) is used to carry out the fracture mechanics experiments. Double cantilever beam (DCB) test specimens (250 mm×25 mm×3 mm) serve as test specimens. All measurements are carried out at 23° C. and 50% relative humidity.

The interlaminar mode II energy release rate (GIIc) is determined in accordance with DIN EN 6034. The end-notched flexure (ENF) test is carried out on a three-point bending apparatus, and the progress of the crack is observed with a microscope over the entire experimental period. A force-displacement diagram is plotted during the experiment in order to determine the interlaminar mode II energy release rate. A universal testing machine (UPM) of the Zwick company (model Z 2.5) is used to carry out the fracture mechanics experiments. ENF test specimens (120 mm×25 mm×3 mm) are used as test specimens. All measurements are carried out at 23° C. and 50% relative humidity.

The fracture mechanics data determined for the fiber-containing composite materials are presented in Table 1:

TABLE 1

| Virantage ™ polyethersulfone (quantity applied in interlaminar region) | GIc (J/m$^2$) | GIIc (J/m$^2$) |
|---|---|---|
| — (ref.) | 248 | 565 |
| 10 g/m$^2$ | 360 | 950 |
| 20 g/m$^2$ | 345 | 1188 |
| 40 g/m$^2$ | 380 | 875 |

It is evident that use of the polyethersulfone particles of the type recited above results in toughness modification, in particular an interlaminar toughness modification, of the fiber-containing composite materials under investigation.

The invention claimed is:

1. A method for manufacturing a fiber-containing composite material, steps of which comprise:
   a) providing fibers,
   b) treating the fibers with thermoplastic particles selected from solid rubbers, block copolymers, polysulfones, polyethersulfones, polyetherketones, polybutylene terephthalates, polycarbonates, polyetherimides, polyalkylenes, polyamides, polyesters, polyamide-imides, polyaryl ethers, or polyarylates,
   c) contacting the treated fibers obtained in step b) with a composition comprising at least one epoxy resin, and at least one initiator that has a neutral charge and contains one or more cationic metal-olefin complexes, to form a fiber-containing agent, and
   d) curing the fiber-containing agent obtained in step c) by irradiation selected from X-radiation, gamma rays, electron beams, or UV rays, sufficient to form a fiber-containing composite material,
   wherein at least 90% of the thermoplastic particles, based on the total number of thermoplastic particles, have an average particle size of 20 μm to 70 μm.

2. The method according to claim 1, wherein the fibers are present in the form of a woven fabric, a mat, a knitted fabric, or a braid.

3. The method according to claim 1, wherein the fibers are carbon fibers.

4. The method according to claim 1, wherein the thermoplastic particles have a glass transition temperature, determined by means of dynamic mechanical analysis (DMA), of at least 45° C.

5. The method according to claim 1, wherein the at least one metal in the cationic metal-olefin complex is selected from silver, cobalt, copper, aluminum, or titanium.

6. The method according to claim 1, wherein the at least one olefin in the cationic metal-olefin complex is selected from propene, 1-butene, 1-pentene, 1-hexene, 1-octene, 1-decene, isoprene, norbornene, cyclohexene, cyclooctene, cyclodecene, 1,4-cyclohexadiene, 4-vinylcyclohexene, trans-2-octene, styrene, 5-norbornene-2-carboxylic acid, butadiene, 1,5-hexadiene, 1,6-heptadiene, 1,7-octadiene, 1,9-decadiene, sorbic acid ethyl ester, 1,3-cyclohexadiene, 1,3-cyclooctadiene, 1,5-cyclooctadiene, norbornadiene, dicyclopentadiene, cycloheptatriene, trans,trans,trans-1,5,9-cyclododecatriene, trans,trans,cis-1,5,9-cyclododecatriene, cyclooctatetraene, squalene, diallyl carbonate, diallyl ether, diallyldimethylsilane, cyclopentadiene, ethyl vinyl ether, limonene, 1,2-dihydronaphthalene, cinnamic acid ethyl ester, ethyl acrylate, ethyl methacrylate, stilbene, oleic acid methyl ester, or linolenic acid methyl ester.

7. The method according to claim 1, wherein the initiator contains, in addition to one or more cationic metal-olefin complexes, one or more anions that are selected from hexafluoroantimonate (SbF$_6^-$), hexafluorophosphate (PF6$^-$), boron tetrafluoride (BF$_4^-$), hexafluoroaluminate (AlF$_6^{3-}$), trifluoromethanesulfonate (CF$_3$SO$_3^-$), nitrate (NO$_3^-$), hexafluoroarsenate (AsF$_6^-$), tetrakis(pentafluorophenylborate) (B[C$_6$F$_5$]$_4^-$), tetrakis[3.5-bis(trifluoromethyl)phenyl]borate (B[C$_6$H$_3$ (CF$_3$)$_2$]$_4^-$), tetraphenylborate (B[C$_6$H$_5$]$_4^-$), hexafluorotitanate (TiF$_6^{2-}$), or hexafluorogermanate (GeF$_6^{2-}$), hexafluorosilicate (SiF$_6^{2-}$), hexafluoronickelate (NiF$_6^{2-}$), or hexafluorozirconate (ZrF$_6^{2-}$).

8. The method according to claim 1, wherein the initiator contains at least five identical or different metal cations that, by way of bridging olefin ligands having at least two C—C double bonds, form a cationic coordination polymer.

9. The method according to claim 1, wherein the initiator is selected from [Ag(cyclohexene)$_{1-4}$]SbF$_6$, [Ag (cyclooctene)$_{1-4}$]SbF$_6$, [Ag (trans-2-octene)$_{1-4}$]SbF$_6$, [Ag(styrene)$_{1-4}$]SbF$_6$, [Ag (5-norbornene-2-carboxylic acid)$_{1-4}$]SbF$_6$, {[Ag(1,5-hexadiene)$_{1-4}$]SbF$_6$}$_{1-p}$, {[Ag (1,7-octadiene)$_{1.5}$]SbF$_6$}$_{1-p}$, {[Ag (1,9-decadiene)$_{1-4}$]SbF$_6$}$_{1-p}$, {[Ag (sorbic acid ethyl ester)$_{1-4}$]SbF$_6$}$_{1-p}$, {[Ag (1,3-cyclohexadiene)$_{1-4}$]SbF$_6$}$_{1-p}$, {[Ag (1,3-cyclooctadiene)$_{1-4}$]SbF$_6$}$_{1-p}$, Ag (1,5-cyclooctadiene)$_2$]SbF$_6$, {[Ag (norbornadiene)$_{1-4}$]SbF$_6$}$_{1-p}$, {[Ag (dicyclopentadiene)$_{1-4}$]SbF$_6$}$_{1-p}$, {[Ag (cycloheptatriene)$_{1-4}$]SbF$_6$}$_{1-p}$, {[Cu (1,7-octadiene)$_{1-4}$]SbF$_6$}$_{1-p}$, [Cu (1,5-cyclooctadiene)$_2$]SbF$_6$, [Ag (allyl glycidyl ether)$_{1-4}$]SbF$_6$, {[Ag(trans,trans,cis-1,5, 9-cyclododecatriene)$_{1-4}$]SbF$_6$}$_{1-p}$, {[Ag(trans,trans,trans-1, 5,9-cyclododecatriene)$_{1-4}$]SbF6}$_{1-p}$, {[Ag(cyclooctatetraene)$_{1-4}$]SbF$_6$}$_{1-p}$, or {[Ag(squalene)$_{1-4}$]SbF$_6$}$_{1-p}$,
wherein p=20,000,000.

10. The method according to claim 1, wherein the initiator is suitable for initiating or accelerating non-thermal hardening of an epoxy resin.

11. A fiber-containing composite material manufactured by the method according to claim 1.

12. The method according to claim 1, wherein steps a) and b) are repeated before step c) is performed.

13. The method according to claim 1, wherein the thermoplastic particles have an average particle size of more than 30 μm to less than 70 μm.

* * * * *

UNITED STATES PATENT AND TRADEMARK OFFICE
CERTIFICATE OF CORRECTION

PATENT NO. : 10,301,444 B2
APPLICATION NO. : 13/243068
DATED : May 28, 2019
INVENTOR(S) : Felipe Wolff Fabris et al.

Page 1 of 1

It is certified that error appears in the above-identified patent and that said Letters Patent is hereby corrected as shown below:

In the Specification

Column 13, Line 16: Change "G1c" to -- GIc --.

Column 13, Line 19: Change "G1c" to -- GIc --.

Column 16, Line 39: Change "G1c" to -- GIc --.

Signed and Sealed this
Twelfth Day of November, 2019

Andrei Iancu
*Director of the United States Patent and Trademark Office*